United States Patent
Jin et al.

(10) Patent No.: US 9,838,909 B2
(45) Date of Patent: *Dec. 5, 2017

(54) TRAFFIC OFFLOAD METHOD, TRAFFIC OFFLOAD FUNCTION ENTITY AND TRAFFIC OFFLOAD SYSTEM

(71) Applicant: Huawei Technologies Co., Ltd., Shenzhen (CN)

(72) Inventors: Weisheng Jin, Shanghai (CN); Xiaoying Xu, Shanghai (CN); Min Xu, Shanghai (CN); Haining Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 660 days.

This patent is subject to a terminal disclaimer.

(21) Appl. No.: 14/227,624

(22) Filed: Mar. 27, 2014

(65) Prior Publication Data

US 2014/0213278 A1 Jul. 31, 2014

Related U.S. Application Data

(63) Continuation of application No. 13/539,115, filed on Jun. 29, 2012, now Pat. No. 8,724,591, which is a (Continued)

(30) Foreign Application Priority Data

Dec. 31, 2009 (CN) .......................... 2009 1 0266521

(51) Int. Cl.
*H04L 12/28* (2006.01)
*H04W 28/08* (2009.01)
(Continued)

(52) U.S. Cl.
CPC ......... *H04W 28/085* (2013.01); *H04W 36/22* (2013.01); *H04W 28/08* (2013.01)

(58) Field of Classification Search
USPC .................................. 370/252, 331, 389, 401
See application file for complete search history.

(56) References Cited

U.S. PATENT DOCUMENTS

2001/0033639 A1* 10/2001 Martin ................ H04M 3/5307
379/88.14
2009/0196233 A1 8/2009 Zhu et al.
(Continued)

FOREIGN PATENT DOCUMENTS

| CN | 1968214 A | 5/2007 |
|---|---|---|
| CN | 101540994 A | 9/2009 |

(Continued)

OTHER PUBLICATIONS

Japanese Office Action received in Application No. 2012-546324 dated Jul. 2, 2013, 3 pages.
(Continued)

*Primary Examiner* — John Pezzlo
(74) *Attorney, Agent, or Firm* — Slater Matsil, LLP (57) ABSTRACT

Embodiments of the present invention provide a traffic offload method, a core network device, and a traffic offload system. The method includes: sending, user information that is of a user equipment within coverage of a first traffic offload function entity to the first traffic offload function entity; sending a traffic offload policy to the first traffic offload function entity, so that the first traffic offload function entity matches the user information with the traffic offload policy and offloads traffic corresponding to the user equipment according to the user information that successfully matches the traffic offload policy.

19 Claims, 3 Drawing Sheets

Related U.S. Application Data continuation of application No. PCT/CN2010/077435, filed on Sep. 29, 2010.

(51) Int. Cl.
*H04W 36/22* (2009.01)
*H04J 1/16* (2006.01)

(56) References Cited

U.S. PATENT DOCUMENTS

| | | | |
|---|---|---|---|
| 2009/0232019 | A1 | 9/2009 | Gupta et al. |
| 2011/0058479 | A1* | 3/2011 | Chowdhury ............ H04L 45/04 370/237 |
| 2011/0075557 | A1 | 3/2011 | Chowdhury et al. |
| 2011/0075675 | A1* | 3/2011 | Koodli .................... H04L 12/14 370/401 |
| 2011/0228676 | A1* | 9/2011 | Zhao ..................... H04W 28/08 370/236 |
| 2012/0040680 | A1 | 2/2012 | Gao et al. |
| 2012/0182940 | A1 | 7/2012 | Taleb et al. |
| 2012/0269134 | A1 | 10/2012 | Jin et al. |
| 2013/0230024 | A1 | 9/2013 | Lim et al. |
| 2014/0213278 | A1 | 7/2014 | Jin et al. |
| 2015/0341812 | A1* | 11/2015 | Dion .................... H04W 24/08 370/252 |

FOREIGN PATENT DOCUMENTS

| | | |
|---|---|---|
| CN | 101547528 A | 9/2009 |
| CN | 101572852 A | 11/2009 |
| CN | 102118789 A | 7/2011 |
| JP | 2013502190 A | 1/2013 |
| JP | 5336668 B2 | 11/2013 |
| WO | 2011069119 A2 | 6/2011 |
| WO | 2012066759 A1 | 5/2012 |

OTHER PUBLICATIONS

3rd Generation Partnership Profect; Technical Specification Group Services and System Aspects; Local IP Access and Selected IP Traffic Offload, 3GPP TR 23.829, V0.2.1, Sep. 2009, 3GPP, 19 pages.

3rd Generation Partnership Project; Technical Specification Group Services and System Aspects; Local IP Access and Selected IP Traffic Offload; (Release 10), 3GPP TR 23.829 V0.3.1, Nov. 2009, 26 pages.

3rd Generation Partnership Project, "Technical Specification Group Services and System Aspects; Local IP Access and Selected IP Traffic Offload (Release 10)," 3GPP TR 23.829, V0.3.1, Nov. 2009, 26 pages.

3rd Generation Partnership Project, "Technical Specification Group Services and System Aspects; General Packet Radio Service (GPRS); Service Description; Stage 2 (Release 9)," 3GPP TS 23.060, V9.3.0, Dec. 2009, 295 pages.

Australian Office Action received in Application No. 2010338889 dated Aug. 8, 2013, 3 pages.

Extended European Search Report received in Application No. 10840423.7-2412 dated Nov. 8, 2012, 10 pages.

Search Report and Partial Translation received in Chinese Application No. 200910266521.0, dated Jul. 24, 2012, 4 pages.

International Search Report received in Patent Cooperation Treaty Application No. PCT/CN2010/077435, dated Jan. 13, 2011, 3 pages.

Huawei, "Selected IP Traffic Offload for UMTS at Iu-PS," 3GPP TSG SA WG2 Meeting #75, TD S2-096067, Kyoto, Japan, Aug. 31, Sep. 4, 2009, 6 pages.

Huawei, "Offload context management for SIPTO at Iu-PS," 3GPP TSG SA WG2 Meeting #76, TD S2-096667, San Jose Del Cabo, Mexico, Nov. 16-20, 2009, 4 pages.

Starent Networks, "Selected IP Traffic Offload for UMTS at IuPS," 3GPP TSG SA WG2 Meeting #76, TD S2-097025, San Jose Del Cabo, Mexico, Nov. 16-20, 2009, 8 pages.

Written Opinion of the International Searching Authority received in Patent Cooperation Treaty Application No. PCT/CN2010/077435, dated Jan. 13, 2011, 5 pages.

U.S. Notice of Allowance received in U.S. Appl. No. 13/539,115 dated Jan. 8, 2014, 13 pages.

U.S. Office Action received in U.S. Appl. No. 13/539,115 dated Aug. 16, 2013, 7 pages.

\* cited by examiner

TRAFFIC OFFLOAD METHOD, TRAFFIC OFFLOAD FUNCTION ENTITY AND TRAFFIC OFFLOAD SYSTEM

This application is a continuation of U.S. patent application Ser. No. 13/539,115, filed on Jun. 29, 2012, which is a continuation of International Application No. PCT/CN2010/077435, filed on Sep. 29, 2010. The International Application claims priority to Chinese Patent Application No. 200910266521.0, filed on Dec. 31, 2009. The afore-mentioned patent applications are hereby incorporated by reference in their entireties.

TECHNICAL FIELD

Embodiments of the present invention relate to the field of communications technologies, and in particular, to a traffic offload method, a core network device, and a traffic offload system

BACKGROUND

The evolution of the third generation (3G) air interface technologies, such as downlink multiple input multiple output (MIMO), downlink 64 quadrature amplitude modulation (QAM), and uplink 16QAM, significantly improves the transmission rate of the air interface, and doubles the throughput of the packet switching (PS) service. As a result, service general packet radio service support nodes (SGSNs), gateway general packet radio service support nodes (GGSNs), value added services (VASs), and the transmission bearers among these nodes encounter an unprecedented pressure, and particularly, rich Internet services raise higher requirements for the transmission bandwidth of the core network (CN), causing that the cost of capacity expansion increases rapidly. The Internet services occupy a large number of transmission resources of mobile operation networks but bring lower profits for mobile operators, and in addition, when users access the Internet services of the packet data network (PDN), the packet flow passes through numerous nodes of the core network, and transmission efficiency is quite low. Therefore, currently the operators are eager to seek a suitable solution, where the nodes near the access side directly route the uplink Internet service flow to the PDN network at low cost, and on contrary, the downlink traffic flow is also directly routed from the PDN network to the access side, so as to offload the data flow of the core network.

In the prior art, that a traffic offload function (TOF) entity for offloading a user data flow is added between a radio network controller (RNC) and an SGSN is proposed, where the TOF entity may be deployed on an Iu-PS interface between a universal mobile telecommunication system (UMTS) network RNC or home Node B gateway (HNB GW) and the SGSN. The TOF entity provides a standard Iu interface towards the RNC/HNB GW and towards the SGSN, and completes the traffic offload function through the Gi interface.

However, the prior art only supports the continuity of offloaded traffic of a mobile user equipment (UE) under a same TOF entity, but does not support the continuity of offloaded traffic of a mobile UE across different TOF entities. Furthermore, in some scenarios, the prior art has problems, for example, the TOF entity is unable to obtain user information.

SUMMARY OF THE INVENTION

Embodiments of the present invention provide a traffic offload method, a traffic offload function entity, and a traffic offload system, so as to implement that the traffic offload function entity may obtain user information and perform traffic offload.

An embodiment of the present invention provides a traffic offload method including sending, by a core network device, user information that is of a user equipment within coverage of a first traffic offload function entity to the first traffic offload function entity. A traffic offload policy to the first traffic offload function entity is sent by the core network device so that the first traffic offload function entity matches the user information with the traffic offload policy and offloads traffic corresponding to the user equipment according to the user information that successfully matches the traffic offload policy.

An embodiment of the present invention further provides a core network device including a user information sending module is configured for sending user information that is of a user equipment within coverage of a first traffic offload function entity to the first traffic offload function entity. The traffic offload policy sending module is configured for sending a traffic offload policy to the first traffic offload function entity, so that the first traffic offload function entity matches the user information with the traffic offload policy and offloads traffic corresponding to the user equipment according to the user information that successfully matches the traffic offload policy.

An embodiment of the present invention further provides a traffic offload system, including: a core network device and a first traffic offload function entity. The core network device is configured for sending user information that is of an user equipment within coverage of a first traffic offload function entity to the first traffic offload function entity and is configured for sending a traffic offload policy to the first traffic offload function entity. The first traffic offload function entity is configured for matching the user information with the traffic offload policy and is configured for offloading traffic corresponding to the user equipment according to the user information that successfully matches the traffic offload policy.

With the embodiments of the present invention, the first traffic offload function entity may receive the user information that is of the user equipment within the coverage of the first traffic offload function entity and sent by the core network device or the second traffic offload function entity, and further, may offload traffic according to the user information, so that the problem that the traffic offload function entity is unable to obtain the user information in some scenarios in the prior art is solved.

BRIEF DESCRIPTION OF THE DRAWINGS

To make the technical solutions in the embodiments of the present invention or in the prior art clearer, the accompanying drawings for describing the embodiments or the prior art are briefly described hereunder. Evidently, the accompanying drawings to be described are some embodiments of the present invention, and those of ordinary skill in the art may obtain other drawings according to these drawings without creative efforts.

DETAILED DESCRIPTION OF ILLUSTRATIVE EMBODIMENTS

To make the objectives, technical solutions, and advantages of the embodiments of the present invention clearer, the technical solutions in the embodiments of the present invention are described clearly and completely below with reference to the accompanying drawings in the embodiments of the present invention. Evidently, the described embodiments are only a par rather than all of embodiments of the present invention. All other embodiments obtained by those of ordinary skill in the art based on the embodiments of the present invention without creative efforts fall within the protection scope of the present invention.

Figure 1:
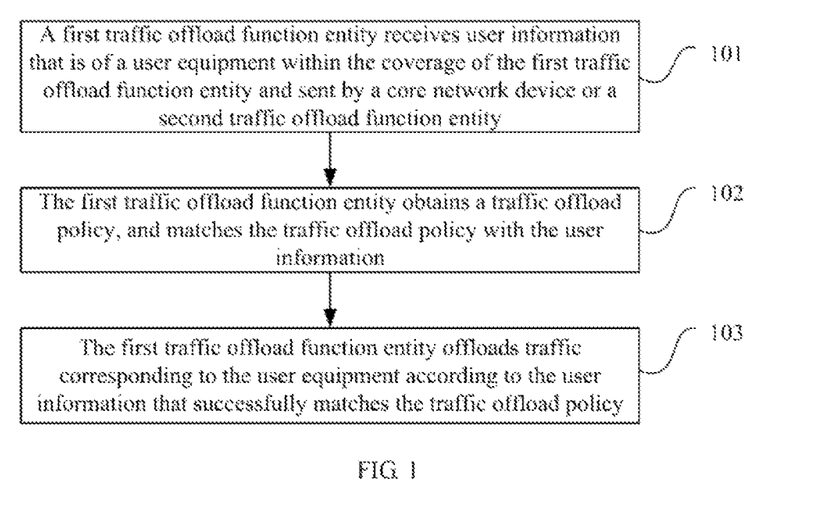
FIG. 1 is a flow chart of a traffic offload method according to an embodiment of the present invention.

FIG. 1 is a flow chart of a traffic offload method according to an embodiment of the present invention. As shown in FIG. 1, this embodiment may include the following.

Step 101: A first traffic offload function entity receives user information that is of a user equipment within the coverage of the first traffic offload function entity and sent by a core network device or a second traffic offload function entity, where the first traffic offload function entity is a traffic offload function entity corresponding to the user equipment after a handover, and the second traffic offload function entity is a traffic offload function entity corresponding to the user equipment before the handover.

Step 102: The first traffic offload function entity obtains a traffic offload policy, and matches the traffic offload policy with the user information.

Step 103: The first traffic offload function entity offloads traffic corresponding to the user equipment according to the user information that successfully matches the traffic offload policy.

In an implementation of the embodiment, the user information that is of the user equipment within the coverage of the first traffic offload function entity is received by the first traffic offload function entity and sent by the core network device. A service request message is sent by the first traffic offload function entity to the core network device. A radio access bearer assignment message sent by the core network device is received. the radio access bearer assignment message carries the user information of the user equipment within the coverage of the first traffic offload function entity.

Alternatively, an access point name delivery request message is sent by the first traffic offload function entity to the core network device. The user information that is of the user equipment within the coverage of the first traffic offload function entity is received and delivered by the core network device. Alternatively, a traffic offload capability or identifier of the first traffic offload function entity is reported, by the first traffic offload function entity, to the core network device. The user information that is of the user equipment within the coverage of the first traffic offload function entity is received and delivered by the core network device.

The obtaining, by the traffic offload function entity, the traffic offload policy may be obtaining, by the first traffic offload function entity, a traffic offload policy stored by the first traffic offload function entity. Alternatively, obtaining, by the traffic offload function entity, the traffic offload policy may be receiving, by the first traffic offload function entity, a traffic offload policy sent by the core network device or the second traffic offload function entity.

The receiving, by the first traffic offload function entity, the traffic offload policy sent by the core network device may be: sending, by the first traffic offload function entity, a service request message to the core network device, and receiving a radio access bearer assignment message sent by the core network device. The radio access bearer assignment message carries the traffic offload policy. Alternatively, an access point name delivery request message to the core network device is sent by the first traffic offload function entity and the traffic offload policy delivered by the core network device is received. Alternatively, a traffic offload capability or identifier of the first traffic offload function entity is reported by the first traffic offload function entity to the core network device and the traffic offload policy delivered by the core network device is received.

The receiving, by the first traffic offload function entity, the traffic offload policy sent by the second traffic offload function entity may be: in the handover process of the user equipment, interacting by the first traffic offload function entity with the second traffic offload function entity during relocation and receiving the traffic offload policy sent by the second traffic offload function entity.

When the user information includes an access point name corresponding to a radio access bearer and the traffic offload policy includes a radio access point name, in step 103, offloading, by the first traffic offload function entity, the traffic corresponding to the user equipment according to the user information that successfully matches the traffic offload policy may be identifying, by the first traffic offload function entity, the radio access bearer corresponding to the access point name that successfully matches the traffic offload policy as a radio access bearer to be offloaded. Further, the identifying may include offloading traffic on the radio access bearer that is identified as a radio access bearer to be offloaded.

The user information may further include a destination IP address and/or a service type, and the traffic offload policy may also include a common traffic offload policy, so that offloading, by the first traffic offload function entity, the traffic on the radio access bearer that is identified as a radio access bearer to be offloaded may be: offloading, by the first traffic offload function entity, traffic on a radio access bearer that is identified as a radio access bearer to be offloaded and successfully matches the common traffic offload policy, where the common traffic offload policy includes a destination IP address and/or a service type.

When the user information includes a destination IP address and/or a service type, and the traffic offload policy includes a common traffic offload policy, in step 103, offloading, by the first traffic offload function entity, the traffic corresponding to the user equipment according to the user information that successfully matches the traffic offload policy may be: offloading, by the first traffic offload function entity, traffic in a traffic flow corresponding to the destination IP address and/or the service type according to the destination IP address and/or the service type that successfully matches the common traffic offload policy.

When the user information includes a destination IP address and/or a service type, and the traffic offload policy includes user level information, in step 103, offloading, by the first traffic offload function entity, the traffic corresponding to the user equipment according to the user information that successfully matches the traffic offload policy may be: when the first traffic offload function entity determines, according to the user level information, to offload traffic in a traffic flow corresponding to the destination IP address and/or the service type that matches the user level information, offloading, the traffic in the traffic flow corresponding to the destination IP address and/or the service type.

When the user information includes an access point name corresponding to a radio access bearer and the traffic offload policy includes a user-dedicated traffic offload policy, where the user-dedicated offload policy includes: one or more of the following: a closed subscriber group supporting traffic offload and an access point name corresponding to the closed subscribed group, information indicating whether the continuity of offloaded traffic is supported, and an offload type, in step 103, offloading, by the first traffic offload function entity, the traffic corresponding to the user equipment according to the user information that successfully matches the traffic offload policy may be: identifying, by the first traffic offload function entity, the radio access bearer corresponding to the access point name that successfully matches the user-dedicated traffic offload policy as a radio access bearer to be offloaded; and then offloading traffic on the radio access bearer that is identified as a radio access bearer to be offloaded. Specifically, when the first traffic offload function entity determines, according to the user level information delivered by the core network device, to offload the traffic on the radio access bearer that is identified as a radio access bearer to be offloaded, the first traffic offload function entity offloads the traffic on the radio access bearer that is identified as a radio access bearer to be offloaded.

In another implementation of this embodiment, receiving, by the first traffic offload function entity, the user information that is of the user equipment within the coverage of the first traffic offload function entity and sent by the second traffic offload function entity may be: in the handover process of the user equipment, interacting by the first traffic offload function entity with the second traffic offload function entity during relocation and receiving the use information that is of the user equipment within the coverage of the first traffic offload function entity and sent by the second traffic offload function entity, where the user information includes one or more of the following: an identifier of a radio access bearer for traffic offload and/or an access point name corresponding to the identifier of the radio access bearer, a temporary mobile subscriber identity, core network discontinuous reception information, a paging area, and a closed subscriber group list.

In still another implementation of this embodiment, receiving, by the first traffic offload function entity, the user information that is of the user equipment within the coverage of the first traffic offload function entity and sent by the core network device may be: receiving, by the first traffic offload function entity, the user information that is of the user equipment within the coverage of the first traffic offload function entity and sent by the core network device; or receiving, by the first traffic offload function entity, non-access stratum security association information that is of the user equipment within the coverage of the first traffic offload function entity and sent by the core network device, and inspecting, according to the non-access stratum security association information of the user equipment, non-access stratum signaling to obtain the user information of the user equipment, where the non-access stratum security association information of the user equipment includes one or more of a non-access stratum key, an encryption algorithm, and a decryption algorithm.

The user information or the non-access stratum security association information of the user equipment is sent by the core network device to the first traffic offload function entity after the core network device receives a request message, non-access stratum signaling, an S1 setup request message, an initial context setup request message, or a non-access stratum message/access stratum message carrying request parameters of the traffic offload function entity sent by the first traffic offload function entity.

In the foregoing embodiment, the first traffic offload function entity may receive the user information that is of the user equipment within the coverage of the first traffic offload function entity and sent by the core network device or the second traffic offload function entity, and further, may offload the traffic according to the user information, so that the problem that the traffic offload function entity is unable to obtain the user information in some scenarios in the prior art is solved.

The implementation of the present invention is described in detail below through several specific embodiments.

Embodiment 1

This embodiment introduces a method for a TOF entity to obtain an APN corresponding to a RAB and offload traffic according to the APN corresponding to the RAB when the user information is the access point name (APN) corresponding to the radio access bearer (RAB). The core network device in this embodiment may be an SGSN.

In this embodiment, when the TOF entity intercepts a service request message sent by a UE, if the TOF entity is unable to determine the APN corresponding to the RAB to be set up, the TOF entity may request the SGSN to deliver the APN corresponding to the RAB. Specifically, after receiving the service request message sent by an RNC, the TOF entity may carry, in the service request message, request information requesting the SGSN to deliver the APN corresponding to the RAB, and forward the service request message carrying the request information to the SGSN, and after receiving the service request message, the SGSN may send to the TOF entity a RAB assignment message, where the RAB assignment message carries the APN corresponding to the RAB; or the TOF entity may send a dedicated APN delivery request message to the SGSN, and after receiving the dedicated APN delivery request message, the SGSN also delivers the APN corresponding to the RAB to the TOF entity through a dedicated delivery message; or the TOF entity may report a traffic offload capability, or an identifier or address of the TOF entity to the SGSN, and then during the RAB assignment, receive the APN corresponding to the RAB delivered by the SGSN through a RAB assignment message or a dedicated delivery message.

Definitely, the embodiment of the present invention is not limited thereto, and the SGSN not only may deliver the APN corresponding to the RAB through the RAB assignment message or the dedicated delivery message, but also may deliver the APN corresponding to the RAB through other defined signaling.

In addition, the TOF entity may also receive the traffic offload policy sent by the SGSN by using a method similar to the method for receiving the APN corresponding to the RAB. Definitely, the embodiment of the present invention is not limited thereto, and the TOF entity may also obtain the traffic offload policy by other means, for example: the TOF entity obtains a traffic offload policy stored by the TOF entity. The embodiment of the present invention imposes no limitation on the method for the TOF entity to obtain the traffic offload policy.

In the method for the TOF entity to send the dedicated APN delivery request message to the SGSN, the TOF entity may request, in the dedicated APN delivery request message, delivery of a list of RAB identifiers corresponding to the APN, and may also not request, in the dedicated APN delivery request message, specific RAB identifiers.

It should be noted that if the SGSN delivers the APN corresponding to the RAB by using a means of adding parameters in the existing message, the TOF entity may store the mapping information of the RAB and the APN after intercepting the message sent by the SGSN, and after deleting the parameters added in the message, forward the message to the access network.

In addition, in the handover process of the UE, the target TOF entity corresponding to the UE after the handover may interact with the source TOF entity corresponding to the UE before the handover during relocation, so as to obtain the user information and/or the traffic offload policy; the user information may include one or more of the following parameters: a RAB identifier for traffic offload and/or an APN corresponding to the RAB identifier, a temporary mobile subscriber identity (TMSI), core network discontinues reception (CN DRX) information, a paging area, and a closed subscriber group (CSG) list. Specifically, after receiving a relocation request message sent by a source RNC corresponding to the UE before the handover, the source TOF entity corresponding to the UE before the handover may add the user information and/or the traffic offload policy in the relocation request message. The user information and/or the traffic offload policy may be placed in a transparent container from the source RNC to a target RNC after the handover or outside the transparent container.

In this embodiment, the traffic offload policy includes an APN. After obtaining the APN corresponding to the RAB, the TOF entity matches the APN with the APN in the traffic offload policy, and then identifies the RAB corresponding to the APN that successfully matches the traffic offload policy as a RAB to be offloaded. Finally, the TOF entity offloads the traffic on the RAB that is identified as a RAB to be offloaded.

Further, if the traffic offload policy further includes a common traffic offload policy in addition to the APN, the TOF entity may also perform a shallow or deep inspection for the traffic on the RAB that is identified as a RAB to be offloaded, that is, perform an Internet protocol (IP) level and/or service level inspection for the traffic on the RAB that is identified as a RAB to be offloaded, and perform matching based on the common traffic offload policy, and then offload the traffic on the RAB that is identified as a RAB to be offloaded and successfully matches the common traffic offload policy, where the common traffic offload policy includes a destination IP address and/or a service type.

In this embodiment, the TOF entity does not identify a RAB corresponding to an APN for which the matching fails, and the traffic packets on the RAB corresponding to the APN for which the matching fails are transparently transmitted in the TOF entity and no policy matching is performed.

In addition, the TOF entity may also offload traffic according to only the common traffic offload policy; specifically, the TOF entity performs an IP level and/or a service level inspection for the traffic flow, and performs matching based on the common traffic offload policy, and then offloads the traffic in the traffic flow corresponding to the destination IP address and/or service type according to the destination IP address and/or the service type that successfully matches the common traffic offload policy. The common traffic offload policy includes the destination IP address and/or the service type.

With the foregoing embodiment, the network using traffic offload implements traffic offload control by the TOF entity based on APN level, avoids performing a shallow packet inspection (SPI) or deep packet inspection (DPI) for the traffic flow on unrelated RABs and the complex policy matching, and reduces the adverse impact on network performance.

Embodiment 2

This embodiment introduces a method for a TOF entity to obtain user information from a core network (CN) to implement traffic offload in a long term evolution (LTE) system; and the core network device in this embodiment may be a mobility management entity (MME).

In the LTE system, when the TOF entity is deployed on an S1 interface, the TOF entity may inspect secured NAS signaling only after obtaining the non-access stratum (NAS) security association of a UE, and may further obtain the user information. Specifically, in this embodiment, the TOF entity may directly receive the user information and the traffic offload policy sent by the MME, so that the TOF entity does not need to inspect the NAS signaling to obtain the information necessary for the traffic offload function; or the TOF entity may interact with the MME, receive NAS security association information of a single UE sent by the MME, and inspect the NAS signaling according to the NAS security association information of the single UE to obtain the user information of the UE, where the NAS security association information of the UE includes one or more of a NAS key, an encryption algorithm, and a decryption algorithm.

In addition, the MME and the TOF entity may establish a private security association, and the interactive information between the MME and the TOF entity may be protected through the private security association between the MME and the TOF entity, for example, the user information sent by the MME to the TOF entity or the NAS security association information of the single UE is protected.

The user information or the NAS security association information of the single UE is sent by the MME to the TOF entity after the MME receives a dedicated request message sent by the TOF entity, or NAS signaling, an S1 setup request message, an initial context setup request message, or a NAS message/S1 application protocol (S1AP) message carrying request parameters of the TOF entity forwarded by the TOF entity. The MME or the source TOF entity before the handover may also, during the handover, sends the user information or the NAS security association information of the single UE to the target TOF entity after the handover through a message during the handover. If the source TOF entity before the handover sends the user information or the NAS security association information of the single UE to the target TOF entity after the handover, the user information or the NAS security association information of the single UE may be placed inside or outside the transparent container. The NAS signaling may be a service request message, an attach message or a route area update (RAU) message.

With the foregoing embodiment, the TOF entity deployed in the LTE system may obtain the user information for traffic offload. Moreover, the TOF deployed in the LTE system may synchronously construct a user context locally.

The method for the CN to directly deliver the user information to the TOF entity provided by this embodiment is also applicable to a UMTS network, simply by substituting an SGSN for the MME to be described above and substituting a radio access network application part (RANAP) message for the S1AP message.

Embodiment 3

In this embodiment, the traffic offload policy includes a user-dedicated traffic offload policy, and the user information includes an APN corresponding to a RAB; and the core network device in this embodiment may be an SGSN or an MME.

After intercepting a service request message sent by a UE, the TOF entity sends a request message to the SGSN to request the core network device to deliver subscription information of the user corresponding to the UE, and then the TOF entity receives the user subscription information that corresponds to the UE and is delivered by the SGSN; the user subscription information corresponding to the UE includes a dedicated traffic offload policy of the UE, where the dedicated traffic offload policy of the UE includes one or more of the following: a CSG supporting traffic offload and an APN corresponding to the CSG, information indicating whether the continuity of offloaded traffic is supported, and an offload type.

In addition, when the SGSN establishes RABs for the UE, in order to implement an offload policy decision based on an APN, the SGSN adds the APN corresponding to each RAB in a RAB assignment message when sending the RAB assignment message to the TOF entity.

In this embodiment, the TOF entity identifies a RAB corresponding to an APN that successfully matches the dedicated traffic offload policy of the UE as a RAB to be offloaded; and then offloads the traffic on the RAB that is identified as a RAB to be offloaded. Specifically, the TOF entity may make a comprehensive decision on traffic offload according to the dedicated traffic offload policy of the UE, the APN corresponding to the established RAB, and an offload policy in other non-subscription information, and then offload traffic according to the result of decision.

In this embodiment, the SGSN may not only deliver the dedicated traffic offload policy of the UE to the TOF entity, but also deliver user level information of the UE, such as: age information of the user. When executing a content-based traffic offload decision, the TOF entity may judge, according to the age information of the user, whether the user is allowed to access the traffic. If the conditions for a traffic offload decision are not met, the TOF entity does not enable the traffic offload and the content filtering function is completed by the CN; and if the TOF entity still enables the traffic offload, the TOF entity needs to implement the content filtering function.

In addition, the TOF entity may also offload traffic according to only the user level information; specifically, when the TOF entity determines, according to the user level information, to offload traffic in a traffic flow corresponding to a destination IP address and/or a service type that matches the user level information, the TOF entity offloads the traffic in the traffic flow corresponding to the destination IP address and/or the service type.

If a part of simple functions of the TOF entity is implemented in a home Node B (HNB) or a home evolved Node B (HeNB), the HNB or HeNB may, according to the age information of the user, determine whether the local IP access (LIPA) can be used.

The solution to traffic offload for a user in a macro network at a roaming location or a home network is the same as the solution to local traffic offload. If the traffic offload policy is in the subscription server of the user, the TOF entity at the roaming location needs to interact with a home subscriber server (HSS) or a home location register (HLR) or a subscription server at the home location to obtain information about the traffic offload policy. It may also be that an SGSN at the roaming location obtains the information about the traffic offload policy from a device storing the traffic offload policy at the home location, and then sends the information to the TOF entity at the roaming location.

If the subscription policy information at the home location is not applicable to the roaming location, for example, a selected Internet protocol traffic offload (SIPTO) is used at an international roaming location or LIPA is used at a roaming location, the roaming location translates the subscription policy information of the home location into the subscription policy information of the roaming location for the user, and uses it as the temporary subscription policy information of the user at the roaming location, and deletes the temporary subscription policy information after the user leaves the roaming location.

In this embodiment, the delivery of the dedicated traffic offload policy of the subscriber by the CN may also be triggered upon satisfaction of at least one of the following three conditions. First, the CN receives a service request message. Second, the local configuration of the CN supports and/or enables the traffic offload function. Third, the CN receives a traffic offload capability, or identifier, address or traffic offload enable indication of the TOF entity sent by other devices such as the TOF entity.

In an LTE system, a part of functions of the TOF entity may be deployed in the serving gateway (SGW) to implement the traffic offload. During session management (SM), the MME or the SGSN delivers the traffic offload policy to the SGW. The traffic offload policy may be based on the subscription information of the user, or may be generated by the MME or the SGSN, and the traffic offload policy may be one or more of the following parameters based on the user level: an IMSI, an APN, a RAB identifier, quality of service (QoS), a service type, and a destination address.

With the foregoing embodiment, the TOF entity may implement a traffic offload decision for a home network based on the dedicated traffic offload policy of the subscriber such as an APN or a CSG.

Embodiment 4

This embodiment introduces a method for maintaining continuous use of offloaded traffic for a user after the traffic offload is performed.

In this embodiment, after the traffic offload is performed, the TOF entity may send valid data packets to a bearer context monitoring node at predetermined time points or periodically, so as to maintain the user plane connection between the radio access network (RAN) and the CN, and stop sending the valid data packets after the UE goes into an idle state. The GGSN filters the valid data packets when making charging statistics. The rules for the TOF entity to construct valid data packets are consistent with the rules for the CN to verify valid packets, that is, the TOF entity needs to forge valid data packets according to a traffic flow template (TFT) to avoid CN processing abnormality; or After performing the traffic offload, the TOF entity may notify the core network device of stopping monitoring the flow of the bearer context corresponding to the offloaded traffic, and after the UE goes into the idle state, notify the core network device of resuming monitoring of the flow of the bearer context corresponding to the offloaded traffic.

In the foregoing embodiment, after performing the traffic offload, the TOF entity sends valid data packets to the bearer context monitoring node at predetermined time points or periodically, so as to maintain the user plane connection between the radio access network and the core network, and stops sending the valid data packets after the user equipment goes into the idle state; or, the TOF entity notifies the core network device of stopping monitoring the flow of the bearer context corresponding to the offloaded traffic, and notifies the core network device of resuming monitoring of the flow of the bearer context corresponding to the offloaded traffic after the user equipment goes into the idle state, so that the TOF entity may solve the problem that the user is unable to continuously use the offloaded traffic, by sending valid data packets to the CN or controlling flow monitoring events of the core network device.

Embodiment 5

This embodiment introduces a method for managing a local user context of the TOF entity; the core network device in this embodiment is an SGSN.

Specifically, the TOF entity may start a timer for user context management after monitoring the release of an Iu connection; and if no RAU message is received before the timer for user context management times out, the user context locally stored by the TOF entity is released. The duration of the timer for user context management is longer than the duration of the timer for periodic route update, and the timer for user context management is delivered by the SGSN to the TOF entity during a RAB assignment; or, the timer for user context management is delivered by the SGSN to the TOF entity after the SGSN receives a request from the TOF entity.

The TOF entity may also release the user context locally stored by the TOF entity after receiving a notification sent by the SGSN. The notification is sent by the SGSN after the SGSN determines that a service request message sent by the UE passes through a new TOF entity, for example, the SGSN sends the notification to the source TOF entity after receiving an identifier of a new TOF entity carried in a NAS message/RANAP message sent by the UE. Optionally, after releasing the user context locally stored by the TOF entity, the TOF entity may send a release complete response to the SGSN.

In the foregoing embodiment, the TOF entity starts a timer for user context management after monitoring the release of an Iu connection; and if no RAU message is received before the timer for user context management times out, the TOF entity releases the user context locally stored by the TOF entity. The timer for user context management may be delivered by the core network device to the TOF entity during a RAB assignment, or delivered by the core network device to the TOF entity after the core network device receives a request from the TOF entity. In addition, the TOF entity may release the user context locally stored by the TOF entity after receiving the notification sent by the core network device; and the notification is sent by the core network device after the core network device determines that the service request message sent by the user equipment passes through a new TOF entity.

The foregoing embodiment solves the problem that the source TOF entity corresponding to the UE before the handover is unable to sense the leaving of the UE from the source TOF entity in time, so that the source TOF entity is unable to delete the locally stored user context in time and thus wastes resources.

Embodiment 6

This embodiment introduces a method for charging for offloaded traffic.

Figure 2:
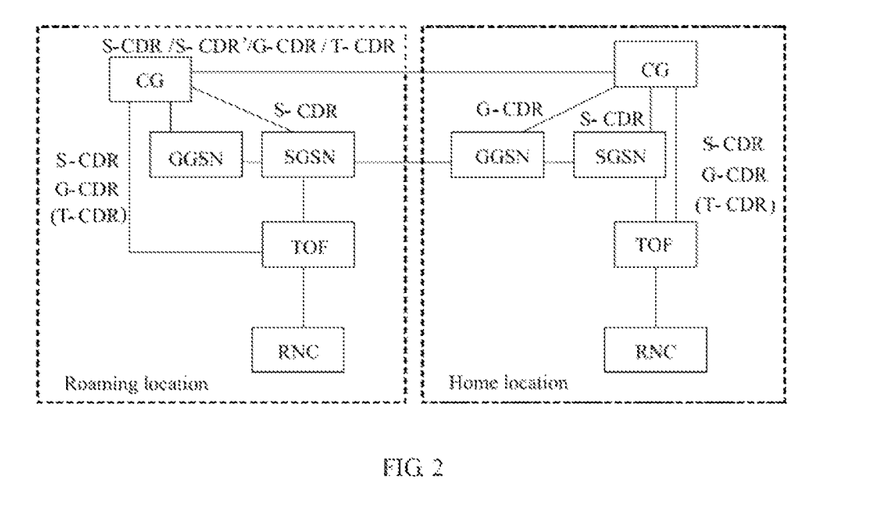
FIG. 2 is a schematic diagram of a charging architecture according to an embodiment of the present invention.

FIG. 2 is a schematic diagram of a charging architecture according to an embodiment of the present invention. In the architecture as shown in FIG. 2, in a non-roaming scenario, the SGSN generally generates an S-charging data record (S-CDR) for an air interface flow and the GGSN generates a G-charging data record (G-CDR) for an external flow. The charging data records generated by the SGSN and the GGSN are both reported to the charging gateway (CG), and the CG combines and sends the charging data records to the charging center. The required fields of the S-CDR are shown in Table 1.

TABLE 1

| Field | Type | Description |
| --- | --- | --- |
| Type of Charging Data Record | M | SGSN IP connectivity access network (SGSN IP CAN) bearer charging data record. |
| Served IMSI | M | IMSI of the served party. |
| Charging Identifier | M | IP CAN bearer identifiers generated by packet switched core network nodes (PCNs), for identifying IP CAN bearers in different charging data records. |
| Address used by GGSN | M | The control plane IP address currently used by the packet data gateway. For an IP CAN bearer in an active state, the address of the packet data gateway is always the same. |
| Start Time for Charging Data Record | M | The time stamp indicating that the IP CAN bearer in the SGSN is activated, or the start time for charging data record in some subsequent charging data records. |
| Duration | M | Duration of charging data records in the SGSN. |
| Reason for Closure of Charging Data Record | M | The reason for closure of charging data records in the SGSN. |
| Charging Characteristics | M | Charging characteristics applicable to the IP CAN bearer. |

When a user uses the TOF entity at a home location, the TOF entity completes the charging function for offloaded traffic. Specifically, the TOF entity firstly obtains a charging identifier corresponding to the offloaded traffic, and then according to the charging identifier, makes statistics for the flow of the offloaded traffic, and generates and reports a normal charging data record to the CG, where the charging data record may be a T-CDR combining the air interface and external flows, and may also be divided into an S-CDR and a G-CDR. After receiving the charging data record of the TOF entity, the CG may send the charging data record together with other S-CDRs and G-CDRs of the user to the charging center.

The required fields of the T-CDR are shown in Table 2.

TABLE 2

| Field | Type | Description |
|---|---|---|
| Type of Charging Data Record | M | TOF IP CAN bearer charging data record. |
| Served IMSI | M | IMSI of the served party. |
| Charging Identifier | M | IP CAN bearer identifiers generate by PCNs, for identifying IP CAN bearers in different charging data records. |
| Address Used by TOF Entity | M | The control plane IP address currently used by the packet data gateway or the address used by the TOF entity. For an IP CAN bearer in an active state, the address of the packet data gateway is always the same. |
| Start Time for Charging Data Record | M | The time stamp indicating that the IP CAN bearer in the SGSN is activated, or the charging data record start time in some subsequent charging data records. |
| Duration | M | Duration of a charging data record in the SGSN. |
| Reason for Closure of Charging Data Record | M | The reason for closure of charging data records in the SGSN. |
| Charging Characteristics | M | Charging characteristics applicable to the IP CAN bearer. |

The conventional CG combines charging data records according to the charging identifiers and the address used by the GGSN. The charging identifiers are generated by the GGSN and responses are created through the bearer context and sent to the SGSN. It can be seen from Tables 1 and Table 2 that, except the address used by the GGSN and the charging identifier, information of all fields may be obtained from the TOF entity. The address used by the GGSN may be replaced with the Internet protocol (IP) address of the TOF entity, or modified to the control plane IP address of the anchor GGSN. The IP address of the anchor GGSN may be delivered by the SGSN to the TOF entity. Specifically, the SGSN may deliver the IP address of the anchor GGSN during the RAB establishment, or the IP address of the anchor GGSN may be delivered through a newly defined radio access network application part (RANAP) message.

In this embodiment, when combining the charging data records, the CG may combine charging data records according to the charging identifier and the address used by the TOF entity, or the CG may combine charging data records according to the charging identifier and the address used by the GGSN.

The obtaining, by the TOF entity, the charging identifier corresponding to the offloaded traffic may specifically be one of the three possibilities. In a first embodiment, changing the CG and the SGSN: the TOF entity uses the IMSI and the network access point identifier (NSAPI) as the charging identifier, and interacts with the CG, and then according to the IMSI and NSAPI, the CG obtains from the SGSN the corresponding charging identifier allocated by the GGSN; the SGSN may also send the charging identifier to the CG on its own initiative. In an alternative second embodiment, without affecting the CG and other CN nodes, an operation administration and maintenance (OAM) server or other servers, such as a policy and charging rules function (PCRF) entity directly configures the charging identifier of the TOF entity. The charging identifier is allocated according to the QoS of the offloaded traffic. Different or same charging identifiers may be allocated for the TOF entity and the GGSN. Alternatively, in a third embodiment, if it is required to generate an item for the same packet data protocol (PDP) on the CN GGSN to combine the CDRs of the TOF entity and the CN GGSN, a same charging identifier may be allocated for the TOF entity and the anchor GGSN. The charging identifier may be delivered by the SGSN. The CN delivers the charging identifier allocated for the GGSN through a RAB establishment message and meanwhile, may also deliver the control plane IP address of the GGSN. At this time, the address of the CN GGSN may be used for the "Address used by GGSN" in Table 2. In addition, it may also be that a network management server or a PCRF entity obtains the information from the GGSN and sends one or more of the control plane address, the charging identifier, the RAB identifier, and the IMSI parameter of the GGSN to the TOF entity.

In a roaming scenario, the anchor GGSN of the roaming user is at the home location, and the anchor SGSN is at the visited location. Charging the user at the visited location is jointly completed by the visited SGSN and the home GGSN. Firstly, the visited SGSN generates and reports an air interface flow charging data record to the visited CG, and the visited CG forwards the air interface flow charging data record to the home CG. The home CG combines and sends the charging data records to the charging center, where the charging data records reported by the visited SGSN are used for inter-network settlement.

When the user uses the visited TOF entity at the visited location, the offloaded traffic does not pass through the home GGSN. Therefore, the visited TOF entity needs to complete the air interface charging and external flow charging function for the offloaded traffic. The visited TOF entity firstly obtains the charging identifier corresponding to the offloaded traffic and then makes statistics for the flow of the offloaded traffic according to the charging identifier and generates a charging data record. The visited TOF entity may generate a charging data record for an air interface flow (such as an S-CDR') and a charging data record for an external flow (such as a G-CDR'), or generate a combined charging data records (such as a T-CDR). If the visited TOF entity generates respectively a charging data records for the air interface flow and a charging data records for the external flow, after the visited TOF entity reports the charging data records to the visited CG, the visited CG needs to combine the S-CDR for non-offloaded traffic generated by the visited SGSN and the S-CDR' for offloaded traffic generated by the visited TOF entity, and then report the combined S-CDR and S-CDR' to the home CG together with the G-CDR' generated by the visited TOF entity. After receiving the charging data records, the home CG combines the charging data records with the charging data records generated by the home SGSN and the home GGSN, where the combining algorithm is the same as the combining algorithm used in a non-roaming scenario. If the visited location generates and reports only a combined T-CDR to the visited CG, the visited CG may directly send the S-CDR for non-offloaded traffic generated by the visited SGSN and the T-CDR generated by the visited TOF entity to the home CG without combining the charging data records, and the home CG completes the charging data record combination and charging for inter-network settlement.

The T-CDR generated by the visited TOF entity is the same as the T-CDR generated by a TOF entity in a non-roaming scenario, and the method for obtaining the charging identifier is also the same as the method for obtaining a charging identifier in a non-roaming scenario.

The foregoing charging scheme in a roaming scenario is also applicable to a scenario where the user offloads traffic at the visited GGSN, that is, the visited GGSN implements the charging function of the visited TOF entity.

In the foregoing embodiment, the TOF entity may obtain the charging identifier corresponding to the offloaded traffic, and according to the charging identifier, make statistics for the flow of the offloaded traffic and generate and report charging data records to the CG, so that the CG combines charging data records according to the charging identifier and the address used by the TOF entity, and thus the charging for the offloaded traffic is implemented.

In addition, when the offloaded traffic is used at the visited location, the visited TOF entity may obtain the charging identifier corresponding to the offloaded traffic, and according to the charging identifier, make statistics for the flow of the offloaded traffic and generate and report the charging data records to the visited CG, so that the visited CG combines the charging data records according to the charging identifier and the address used by the visited TOF entity, and sends the combined charging data records to the home CG for inter-network settlement, and thus the charging for the offloaded traffic in a roaming scenario is implemented.

The obtaining, by the TOF entity, the charging identifier corresponding to the offloaded traffic may be: interacting, by the TOF entity, with the CG by using an international mobile subscriber identity and a network service access point identifier, so that the CG obtains the charging identifier corresponding to the offloaded traffic from the core network device according to the international mobile subscriber identity and the network service access point identifier; or, obtaining, by the TOF entity, the charging identifier corresponding to the offloaded traffic configured by an operation administration and maintenance server, where the charging identifier is allocated according to the quality of service of the offloaded traffic; or, obtaining, by the TOF entity, the charging identifier corresponding to the offloaded traffic delivered by a policy and charging rules function entity or a core network device, where the charging identifier obtained by the TOF entity is the same as the charging identifier of the anchor gateway general packet radio service support node.

The foregoing embodiment solves the charging problem after a TOF entity is introduced, including the charging problems of the non-roaming users and the roaming users.

Embodiment 7

In the prior art, the movement of a UE across different TOF entities causes a transport layer interruption, which cannot ensure the traffic continuity. To ensure the traffic continuity, this embodiment provides a method for establishing a data forwarding tunnel between TOF entities during a handover. Specifically, when a UE hands over across different TOF entities, a data forwarding tunnel may be established between the TOF entity corresponding to the UE before the handover and the TOF entity corresponding to the UE after the handover during the relocation preparation.

This embodiment further provides a method for alleviating the problem of packet loss. From the perspective of quickly resuming communication of the UE, during the handover across different TOF entities, it is possible to consider using access stratum (AS) or NAS signaling to notify the radio resource control (RRC) or NAS layer of the UE that a service connection establishment or reestablishment indication needs to be initiated, and a primitive interaction is performed between the AS and the application layer or between the NAS and the application layer, so that the UE is triggered in time to re-initiate a service connection establishment or application connection establishment procedure to establish a connection between the server and the network address translation (NAT) node.

One implementation is: a timer is started on the side of the source TOF entity before the handover, for managing the forwarding of the offloaded traffic data, while the data forwarding tunnel is implemented in a conventional way, that is, the data forwarding tunnel is sent by a target RNC after the handover to the source RNC before the handover in a relocation response message. Specifically, after receiving the Iu release complete (Iu Release Complete) command sent by the source RNC, the source TOF entity before the handover removes from the Iu release complete command the RABs released item information element (RABs Released Item IE) including the offloaded traffic, and then forwards the Iu release complete command to the SGSN, to avoid deleting the tunnel for the user to forward the offloaded traffic. At the same time, a timer for managing the forwarding of the offloaded traffic data is started on the side of the source TOF entity before the handover, and the timer is restarted when the downlink offloaded traffic of the user is received. If no downlink offloaded traffic data is received before the timer times out, an Iu release complete command or an offloaded traffic forwarding tunnel delete message is constructed and sent to the SGSN to stop forwarding data and delete relevant information of the data forwarding tunnel. If a handover is performed between TOF entities between SGSNs, the foregoing messages are also transferred between the SGSNs.

Another implementation is: when the source TOF entity before the handover receives a relocation request message from the RNC, the source TOF entity before the handover sets a RAB identifier for traffic offload, and the target TOF entity after the handover adds, in the relocation response message of the RNC, an indication message for establishing a data forwarding tunnel between TOF entities. Specifically, the offload RAB identifier, the TOF transport layer address and the TOF Iu transport association of the TOF entity may be added. After receiving the relocation response message, the source TOF entity before the handover forwards data to the target TOF entity after the handover. When the timer on the side of the source TOF entity before the handover times out, a data forwarding tunnel delete message is sent to the SGSN to notify the target TOF entity after the handover of deleting the data forwarding tunnel and stopping forwarding data.

Still another implementation is: a timer for managing the forwarding of offloaded traffic data is started on the side of the target TOF entity after the handover. After enabling the offload function, the target TOF entity after the handover stops receiving forwarded data and notifies the source RNC before the handover to delete the data forwarding tunnel, or after the handover is completed, the timer for managing the forwarding of offloaded traffic data is started, and after the forwarded data is received, the timer is restarted. If no forwarded data is received before the timer times out, the data forwarding tunnel is deleted. For the data forwarding tunnel, a conventional data forwarding tunnel, or a dedicated data forwarding tunnel established between TOF entities in the foregoing way may be used.

In the foregoing embodiment, when the UE hands over across different TOF entities, a data forwarding tunnel is established, through the relocation process, between the TOF entity corresponding to the UE before the handover and the TOF entity corresponding to the UE after the handover.

In the foregoing embodiment, establishment of a data forwarding tunnel for offloaded traffic between the TOF entities is implemented, and the continuity of the offloaded traffic for the user is ensured.

Those of ordinary skill in the art may understand that all or part of steps in the above method embodiments may be implemented by relevant hardware instructed by a program. The program may be stored in a computer readable storage medium, and when the program runs, the steps of the above method embodiments are executed; and the foregoing storage medium may be any medium for storing program codes, such as a ROM, a RAM, a magnetic disk, and an optical disk.

Figure 3:
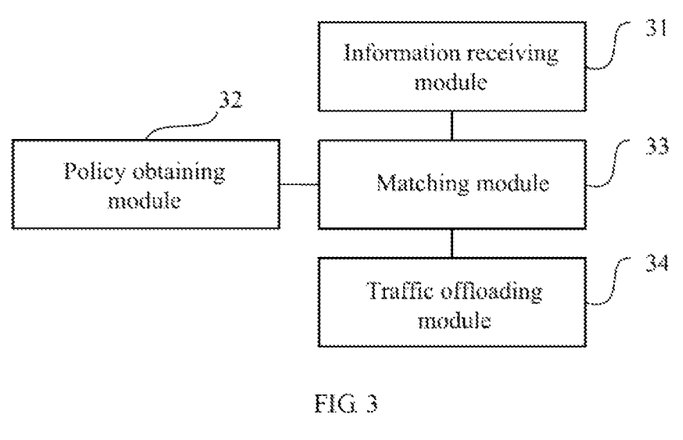
FIG. 3 is a schematic structure diagram of a first traffic offload function entity according to an embodiment of the present invention.

FIG. 3 is a schematic structure diagram of a first traffic offload function entity according to an embodiment of the present invention. The first traffic offload function entity according to this embodiment may implement the process of the embodiment shown in FIG. 1 of the present invention. As shown in FIG. 3, the first traffic offload function entity may include: an information receiving module 31, a policy obtaining module 32, a matching module 33, and a traffic offloading module 34.

The information receiving module 31 is configured to receive user information that is of a user equipment within the coverage of the first traffic offload function entity and sent by a core network device or a second traffic offload function entity, where the first traffic offload function entity is a traffic offload function entity corresponding to the user equipment after a handover, and the second traffic offload function entity is a traffic offload function entity corresponding to the user equipment before the handover.

Specifically, the information receiving module 31 may send a service request message to the core network device and receive a radio access bearer assignment message sent by the core network device, where the radio access bearer assignment message carries the user information of the user equipment within the coverage of the first traffic offload function entity; or, the information receiving module 31 may send an access point name delivery request message to the core network device and receive the user information that is of the user equipment within the coverage of the first traffic offload function entity and delivered by the core network device. Alternatively, the information receiving module 31 may report a traffic offload capability or identifier of the first traffic offload function entity to the core network device, and receive the user information that is of the user equipment within the coverage of the first traffic offload function entity and delivered by the core network device.

When the user equipment performs a handover, the information receiving module 31 is specifically configured to interact with the second traffic offload function entity during the relocation, and receive the user information that is of the user equipment within the coverage of the first traffic offload function entity and sent by the second traffic offload function entity. The user information includes one or more of the following: an identifier of a radio access bearer for traffic offload and/or an access point name corresponding to the identifier of the radio access bearer, a temporary mobile subscriber identity, core network discontinues reception information, a paging area, and a closed subscriber group list.

The policy obtaining module 32 is configured to obtain a traffic offload policy; specifically, the policy obtaining module 32 may obtain a traffic offload policy stored by the first traffic offload function entity. Alternatively, the policy obtaining module 32 may receive a traffic offload policy sent by the core network device or the second traffic offload function entity.

The matching module 33 is configured to match the user information received by the information receiving module 31 with the traffic offload policy obtained by the policy obtaining module 32.

The traffic offloading module 34 is configured to offload, according to the user information that successfully matches the traffic offload policy, the traffic corresponding to the user equipment. Specifically, when the user information includes an access point name corresponding to a radio access bearer, and the traffic offload policy includes a radio access point name, the traffic offloading module 34 may identify the radio access bearer corresponding to the access point name that successfully matches the traffic offload policy as an radio access bearer to be offloaded and offload traffic on the radio access bearer that is identified as a radio access bearer to be offloaded.

When the user information obtained by the information receiving module 31 also includes a destination IP address and/or a service type, and the traffic offload policy further includes a common traffic offload policy, offloading the traffic on the radio access bearer that is identified as a radio access bearer to be offloaded specifically is: offloading, by the traffic offloading module 34, the traffic on a radio access bearer that is identified as a radio access bearer to be offloaded and successfully matches the common traffic offload policy, where the common traffic offload policy includes the destination IP address and/or the service type.

Figure 4:
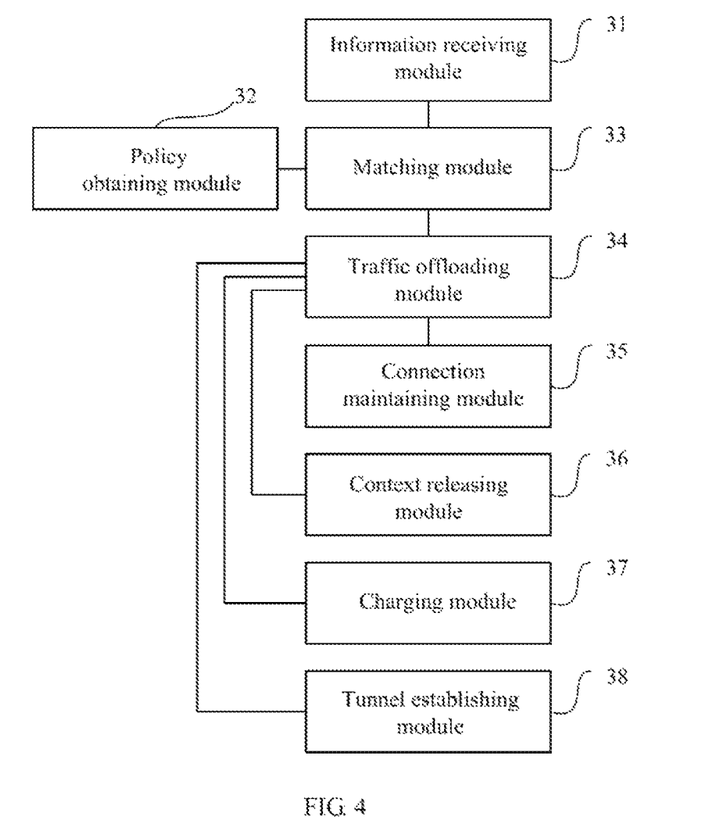
FIG. 4 is a schematic structure diagram of a first traffic offload function entity according to another embodiment of the present invention.

FIG. 4 is a schematic structure diagram of a first traffic offload function entity according to another embodiment of the present invention. Compared with the first traffic offload function shown in FIG. 3, the first traffic offload function entity shown in FIG. 4 has a difference that the first traffic offload function entity shown in FIG. 4 further includes: a connection maintaining module 35, a context releasing module 36, a charging module 37, and a tunnel establishing module 38.

The connection maintaining module 35 is configured to send valid data packets to a bearer context monitoring node at predetermined time points or periodically in order to maintain a user plane connection between the radio access network and the core network, and stop sending the valid data packets after the user equipment goes into an idle state; or notify the core network device of stopping monitoring the flow of the bearer context corresponding to the offloaded traffic, and after the user equipment goes into the idle state, notify the core network device of resuming monitoring of the flow of the bearer context corresponding to the offloaded traffic.

The context releasing module 36 is configured to start a timer for user context management after the release of an Iu connection is monitored; and if no route area update message is received before the timer for user context management times out, release the user context locally stored by the traffic offload function entity; or, after receiving a notification sent by the core network device, release the user context locally stored by the traffic offload function entity, where the notification is sent by the core network device after the core network device determines that the service request message sent by the user equipment passes through a new traffic offload function entity.

The charging module 37 is configured to charge for the offloaded traffic.

The tunnel establishing module 38 is configured to establish, when the user equipment hands over across different traffic offload function entities, a data forwarding tunnel between the traffic offload function entity corresponding to the user equipment before the handover and the traffic offload function entity corresponding to the user equipment after the handover through the relocation process.

In the foregoing embodiment, the first traffic offload function entity may receive the user information that is of the user equipment within the coverage of the first traffic offload function entity and sent by the core network device or the second traffic offload function entity, and may further offload the traffic according to the user information, so that the problem that the traffic offload function entity is unable to obtain the user information in some scenarios in the prior art is solved.

Figure 5:
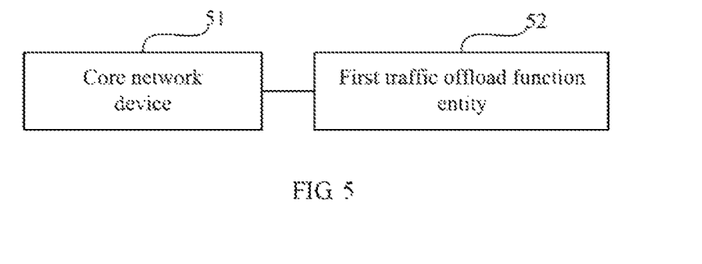
FIG. 5 is a schematic structure diagram of a traffic offload system according to an embodiment of the present invention.

FIG. 5 is a schematic structure diagram of a traffic offload system according to an embodiment of the present invention. As shown in FIG. 5, the traffic offload system may include: a core network device 51 and a first traffic offload function entity 52.

The first traffic offload function entity 52 is configured to receive user information that is of a user equipment within the coverage of the first traffic offload function entity 52 and sent by the core network device 51 or a second traffic offload function entity, where the first traffic offload function entity 52 is a traffic offload function entity corresponding to the user equipment after a handover and the second traffic offload function entity is a traffic offload function entity corresponding to the user equipment before the handover; then, the first traffic offload function entity 52 obtains a traffic offload policy, matches the traffic offload policy with the user information, and offloads traffic corresponding to the user equipment according to the user information that successfully matches the traffic offload policy. Specifically, the first traffic offload function entity 52 may be implemented through the first traffic offload function entity as shown in FIG. 3 or FIG. 4 of the present invention.

In the foregoing embodiment, the first traffic offload function entity 52 may receive the user information that is of the user equipment within the coverage of the first traffic offload function entity 52 and sent by the core network device 51 or the second traffic offload function entity, and may further offload the traffic according to the user information, so that the problem that the traffic offload function entity is unable to obtain the user information in some scenarios in the prior art is solved.

Those skilled in the art may understand that the accompanying drawings are merely schematic diagrams of an exemplary embodiment, and that modules or processes in the accompanying drawings are not mandatory for implementing the present invention.

Those skilled in the art may understand that the modules in an apparatus according to an embodiment may be distributed in the apparatus according to the embodiment as described in the embodiment, or may be disposed in one or more apparatuses different from the embodiment. The modules of the above embodiments may be combined into one module or further divided into more submodules.

Finally, it should be noted that, the above embodiments are merely used to illustrate the technical solutions of the present invention instead of limiting the technical solutions of the present invention. Although the present invention has been described in detail with reference to the foregoing embodiments, those of ordinary skill in the art should understand that, they may still make modifications to the technical solutions described in the foregoing embodiments or make equivalent replacements to some technical features thereof, and these modifications and replacements do not cause the essence of the corresponding technical solutions to depart from the spirit and scope of the technical solutions of the embodiments of the present invention.

What is claimed is:

1. A traffic offload function (TOF) entity, comprising:
a processor; and
a non-transitory computer readable storage medium storing a program for execution by the processor, the program including instructions to enable the TOF entity to perform operations including:
receiving user information that is of a user equipment within coverage of the TOF entity, the user information of the user equipment comprising a first access point name (APN) corresponding to a radio access bearer (RAB);
obtaining a traffic offload policy from a core network device, wherein the traffic offload policy comprises a second APN;
determining whether the RAB is to be offloaded by determining whether the traffic offload policy matches the user information, determining whether the traffic offload policy matches the user information comprising determining whether the first APN in the user information matches the second APN in the traffic offload policy;
offloading traffic on the RAB in response to the traffic offload policy successfully matching the user information; and
transparently transmitting the traffic on the RAB to the core network device in response to the traffic offload policy failing to match the user information.

2. The TOF entity according to claim 1, wherein the user information comprises an RAB identifier for the traffic.

3. The TOF entity according to claim 1, wherein the operations further include:
identifying, by the TOF entity, the RAB as an RAB to be offloaded in response to the traffic offload policy successfully matches the user information.

4. The TOF entity according to claim 1, wherein the traffic offload policy is comprised in an RAB assignment message.

5. The TOF entity according to claim 1, wherein the TOF entity is deployed on an Iu-PS interface between a radio network controller (RNC) and a Serving General Packet Radio Service Support Node (SGSN).

6. The TOF entity according to claim 1, wherein the TOF entity further comprises standard Iu interfaces towards an RNC and an SGSN for transmitting the traffic.

7. The TOF entity according to claim 1, wherein the TOF entity is deployed on an S1 interface between a base station and a Mobility Management Entity (MME).

8. A traffic offload method, comprising:
receiving, by a traffic offload function (TOF) entity, user information that is of a user equipment within coverage of the TOF entity, the user information of the user equipment comprising a first access point name (APN) corresponding to a radio access bearer (RAB);
obtaining, by the TOF entity, a traffic offload policy from a core network device, wherein the traffic offload policy comprises a second APN;
determining whether the RAB is to be offloaded by determining whether the traffic offload policy matches the user information, determining whether the traffic offload policy matches the user information comprising determining whether the first APN in the user information matches the second APN in the traffic offload policy;
offloading, by the TOF entity, traffic on the RAB in response to the traffic offload policy successfully matching the user information; and
transparently transmitting, by the TOF entity, the traffic on the RAB to the core network device in response to the traffic offload policy failing to match the user information.

9. The method according to claim 8, wherein the user information comprises an RAB identifier for the traffic.

10. The method according to claim 8, further comprising:
identifying, by the TOF entity, the RAB as an RAB to be offloaded in response to the traffic offload policy successfully matching the user information.

11. The method according to claim 8, wherein the traffic offload policy is comprised in an RAB assignment message.

12. A traffic offload system, comprising:
a core network device; and
a traffic offload function (TOF) entity, comprising:
  a processor; and
  a non-transitory computer readable storage medium storing a program for execution by the processor, the program including instructions to enable the TOF entity to perform operations including:
    receiving user information that is of a user equipment within coverage of the TOF entity, the user information of the user equipment comprising a first access point name (APN) corresponding to a radio access bearer (RAB);
    obtaining a traffic offload policy from the core network device, wherein the traffic offload policy comprises a second APN;
    determining whether the RAB is to be offloaded according to a determination of whether the traffic offload policy matches the user information, the determination is performed by determining whether the first APN in the user information matches the second APN in the traffic offload policy;
    offloading traffic on the RAB in response to the traffic offload policy successfully matching the user information; and
    transparently transmitting the traffic on the RAB to the core network device in response to the traffic offload policy failing to match the user information.

13. The traffic offload system according to claim 12, wherein the user information comprises a RAB identifier for the traffic.

14. The traffic offload system according to claim 12, wherein the operations further include:
identifying, by the TOF entity, the RAB as an RAB to be offloaded in response to the traffic offload policy successfully matching the user information.

15. The traffic offload system according to claim 12, wherein the traffic offload policy is comprised in an RAB assignment message.

16. The traffic offload system according to claim 12, wherein the core network device is a Serving General Packet Radio Service Support Node (SGSN), and the TOF entity is deployed on an Iu-PS interface between a radio network controller (RNC) and the SGSN.

17. The traffic offload system according to claim 12, wherein the core network device is an SGSN, and the TOF entity further comprises standard Iu interfaces towards an RNC and the SGSN for transmitting the traffic.

18. The traffic offload system according to claim 12, wherein the core network device is a Mobility Management Entity (MME), and the TOF entity is deployed on an S1 interface between a base station and the MME.

19. A computer program product comprising a non-transitory computer readable storage medium storing program code thereon for use by a traffic offload function (TOF) entity in a communication network, the program code comprising instructions for:
receiving user information that is of a user equipment within coverage of the TOF entity, the user information of the user equipment comprising a first access point name (APN) corresponding to a radio access bearer (RAB);
obtaining a traffic offload policy from a core network device, wherein the traffic offload policy comprises a second APN;
determining whether the RAB is to be offloaded by determining whether the traffic offload policy matches the user information, determining whether the traffic offload policy matches the user information comprising determining whether the first APN in the user information matches the second APN in the traffic offload policy;
offloading traffic on the RAB in response to the traffic offload policy successfully matching the user information; and
transparently transmitting the traffic on the RAB to the core network device in response to the traffic offload policy failing to match the user information.

* * * * *